US008358867B1

(12) United States Patent
Kass et al.

(10) Patent No.: US 8,358,867 B1
(45) Date of Patent: Jan. 22, 2013

(54) PAINTERLY FILTERING

(75) Inventors: Michael Kass, Berkeley, CA (US);
Justin Solomon, Oakton, VA (US)

(73) Assignee: Pixar, Emeryville, CA (US)

( * ) Notice: Subject to any disclaimer, the term of this patent is extended or adjusted under 35 U.S.C. 154(b) by 792 days.

(21) Appl. No.: 12/493,208

(22) Filed: Jun. 28, 2009

Related U.S. Application Data

(60) Provisional application No. 61/145,966, filed on Jan. 20, 2009.

(51) Int. Cl.
*G06K 9/40* (2006.01)
(52) U.S. Cl. ........................................ 382/266
(58) Field of Classification Search .................. 382/266
See application file for complete search history.

(56) References Cited

U.S. PATENT DOCUMENTS

| | | | | |
|---|---|---|---|---|
| 7,102,638 | B2 * | 9/2006 | Raskar et al. | 345/428 |
| 8,207,987 | B2 * | 6/2012 | Lee et al. | 345/619 |
| 2004/0183925 | A1 * | 9/2004 | Raskar et al. | 348/239 |
| 2004/0183940 | A1 * | 9/2004 | Raskar | 348/371 |
| 2010/0202701 | A1 * | 8/2010 | Basri et al. | 382/199 |

OTHER PUBLICATIONS

Johan H, Hashimoto R, Nishita T(2004) Creating watercolor style images taking into account painting techniques. The Journal of the Society for Art and Science 3(4):207-215.*
Way DL, Shih, ZC(2001) The synthesis of rock textures in Chinese landscape painting. Computer Graphics Forum 20(3):C123-C131.*

* cited by examiner

*Primary Examiner* — Aaron W Carter
(74) *Attorney, Agent, or Firm* — Kilpatrick Townsend & Stockton LLP

(57) ABSTRACT

Local histogram-based filters may create non-photorealistic computer graphics effects. An edge-preserving smoothing filter processes a source image to generate a smoothed image. An orientation filter processes the source image to generate a smoothed orientation image. At least one of the orientation filter and the edge-preserving smoothing filter include a local histogram-based filter. The non-photorealistic effect filter may generate a fine detail image from the smoothed image and the source image. The fine detail image may be diffused according to the smoothed orientation image to generate a brush stroke image. The brush stroke image is combined with a base image to create a non-photorealistic image. Local histogram-based filters include a closest mode, a local median, and a dominant mode filter. Local histogram-based filters are determined by convolving a neighborhood filter with one or more offset-kernel images, each based on the application of a shifted tonal filter kernel to the source image.

29 Claims, 5 Drawing Sheets

PAINTERLY FILTERING

CROSS REFERENCE TO RELATED APPLICATIONS

This application is claims priority to U.S. Provisional Patent Application No. 61/145,966, filed Jan. 20, 2009, which is incorporated by reference herein for all purposes. This application is related to U.S. patent application Ser. No. 12/493,207, which is incorporated by reference herein for all purposes.

BACKGROUND

The present invention relates to the field of computer graphics, and in particular to methods and apparatus for analyzing and filtering of still images, video, and other one-dimensional, two-dimensional, three-dimensional, four-dimensional, and higher-dimensional data sets to produce visual effects.

Traditional computer graphics applications, such as renderers have often focused on generating photorealistic images and animation. However, there are a wide variety of uses for non-photorealistic images and animation. Non-photorealistic computer graphics can be used to apply artistically expressive styles to two-dimensional images and three-dimensional graphics data. For example, non-photorealistic computer graphics techniques can be used to simulate the look of traditional artistic media, such as pen and ink drawings, oil paints, watercolors, or hand-drawn cel animation. Similarly, non-photorealistic computer graphics techniques may be used to mimic a particular artistic style, such as impressionism or pointillism. Additionally, non-photorealistic computer graphics techniques can be used to highlight areas of interest or improve the legibility Many prior non-photorealistic computer graphics techniques are computationally expensive and time consuming to apply. Additionally, prior non-photorealistic computer graphics techniques can produce visual artifacts, such as halos, that may need to be corrected by hand or additional processing. Furthermore, typical prior non-photorealistic computer graphics techniques are not time coherent. This means that stylistic elements, such as brush strokes or cross-hatching lines, may change abruptly and discontinuously between successive frames of video or animation. This lack of time-coherence can be visually jarring and makes the underlying animation of objects appear disconnected from the simulated artistic medium.

BRIEF SUMMARY

An embodiment of the invention includes a local histogram-based filter to create non-photorealistic computer graphics effects. In an embodiment, an edge-preserving smoothing filter processes a source image to generate a smoothed image. Additionally, an orientation filter processes the source image to generate a smoothed orientation image. In an embodiment, at least one of the orientation filter and the edge-preserving smoothing filter include a local histogram-based filter. An embodiment of the non-photorealistic effect filter generates a fine detail image from the difference between the smoothed image and the source image. The fine detail image is diffused according to the smoothed orientation filter to generate a diffused detail image, which may be remapped to enhance its contrast and become a brush stroke image. The brush stroke image is combined with a base image, such as the source image or the smoothed image to create a non-photorealistic computer graphics image.

Embodiments of local histogram-based filters include a closest mode filter, a local median filter, and a dominant mode filter. In an embodiment, local histogram-based filters are determined by convolving a neighborhood filter with one or more offset-kernel images. Each offset-kernel image can be generated based on the application of a shifted tonal filter kernel to the source image. Shifted tonal filter kernels can represent histogram kernels, derivatives of kernels, integrals of kernels, or other arbitrary function kernels.

In an embodiment, the local histogram-based filter includes a local neighborhood having at least one spatial dimension. In a further embodiment, the local histogram-based filter includes a local neighborhood having at least one temporal dimension. In still a further embodiment, the local neighborhood is causal in its temporal dimension.

BRIEF DESCRIPTION OF THE DRAWINGS

The invention will be described with reference to the drawings, in which.

DETAILED DESCRIPTION OF THE INVENTION

Embodiments of the invention may use local histogram and local histogram-based functions to create non-photorealistic computer graphics effects. A global image histogram specifies the distribution or quantity of colors, tones, intensities, or other scalar, vector, or tuple pixel values in still images or video. A global image histogram specifies the number of pixels in a complete image having a specific color, tone, intensity, or other attribute value, or falling within a specific range of color, tone, intensity, or other attribute values. A local image histogram specifies the distribution or quantity of pixel values within a specific portion of an image or video, such as within a given distance from a specified pixel, referred to as a pixel's neighborhood. Typically, each pixel in an image may its own local histogram, because each pixel includes a different set of pixels in its respective neighborhood.

Figure 1:
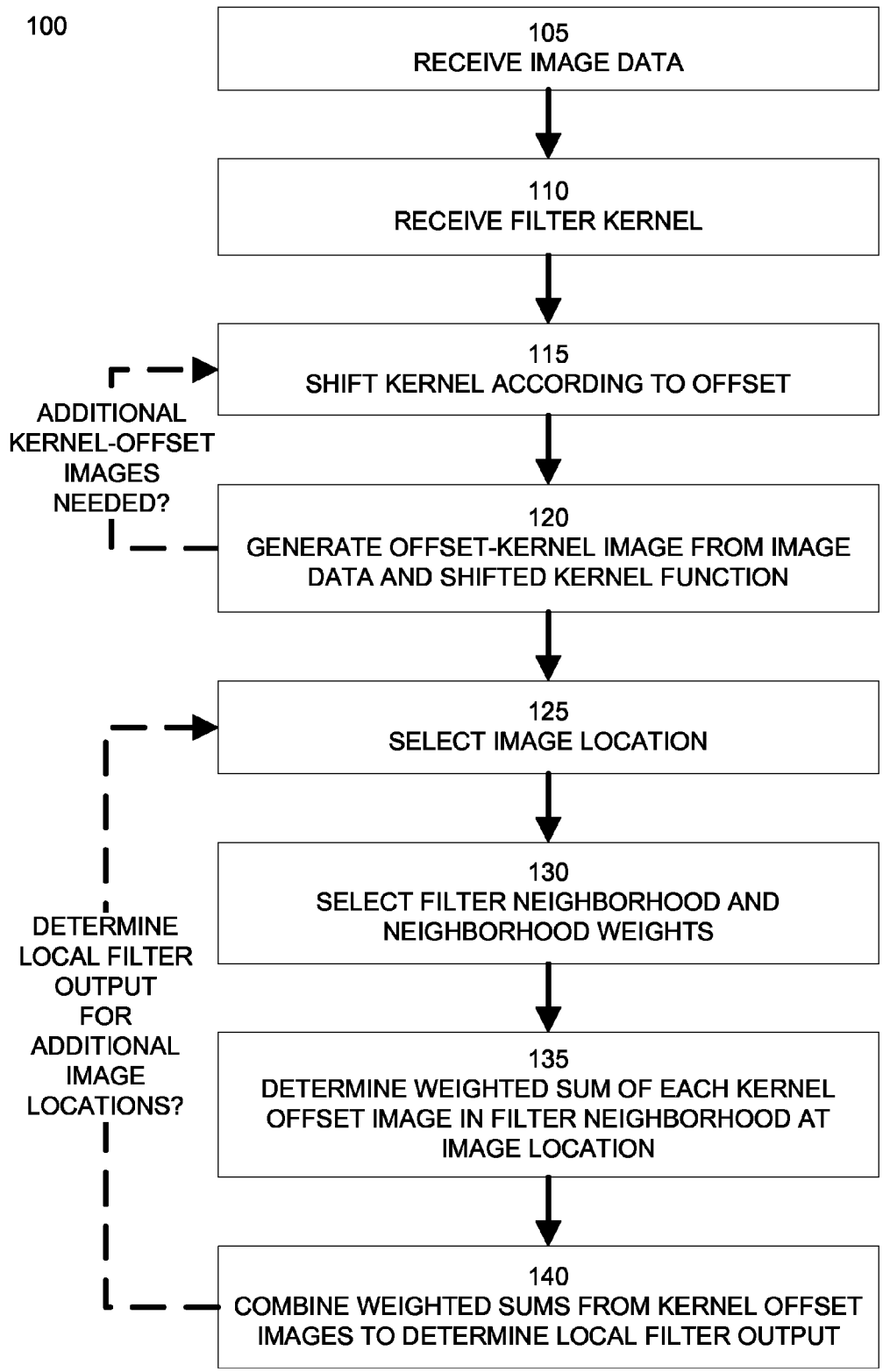
FIG. 1 illustrates a method of computing local histograms and local histogram-based attributes according to an embodiment of the invention.

FIG. 1 illustrates a method 100 of computing local histograms and local histogram-based attributes according to an embodiment of the invention. Method 100 may be used to determine the values of local histograms and local histogram-based functions, such as the derivatives or integrals of a local histogram.

Step 105 receives a set of image data, referred to as a source image. In this application, the term image is used to describe any type of one-dimensional, two-dimensional, three-dimensional, four-dimensional, or higher-dimensional data set. Examples of image data include still images and other two dimensional data sets, three-dimensional data sets such as video, animation, voxel data sets, and volumetric data structures. One dimension of the image or data set may correspond with time, such as a sequence of two-dimensional images arranged in time (represented as a three-dimensional data set) or a sequence of three dimensional voxel data arranged in time (represented as a four-dimensional data set). Image data may be generated by users using computer graphics content creation software, collected from the physical world using still or video cameras or other two-dimensional or three-dimensional imaging devices.

Each image include a plurality of pixels. In this application, the term pixel is used to describe any data element included in an image. A pixel or data element of an image includes one or more scalar, vector, tuple, or other values. An example of a pixel value is a scalar representing the intensity or other attribute, such as density, of the image at the pixel's location in the image. Another example of a pixel value may be a vector or tuple representing a color in a color space, such as RGB or HSV color space.

Step 110 receives a tonal filter kernel to be used to determine one or more local histograms or local histogram-based attribute values of the image source. As described in detail below, a wide variety of tonal filter kernels may be used to process the image. Embodiments of the invention may use any arbitrary function as a tonal filter kernel to map a pixel value to a corresponding tonal filter kernel function value. In a further embodiment, the tonal filter kernel integrates to a value of one.

Step 115 shifts the domain of the tonal filter kernel function according an offset. In an embodiment, the shifted tonal filter kernel is identical to the original tonal filter kernel, but centered around a different pixel value. For example, tonal filter kernel originally centered around a pixel value of 0.5 and covering the interval of pixel values from 0.4 up to, but not including, 0.6 may be shifted to be centered around a pixel value of 0.1 and covering the interval of pixel values from 0.0 up to, but not including, 0.2.

Step 120 generates an offset-kernel image from the received image data and the shifted kernel image. Each pixel of an offset-kernel image is generated by mapping the corresponding pixel of the received source image according to the shifted kernel function.

Steps 115 and 120 may be repeated to generate one or more additional offset-kernel images, each based on the tonal filter kernel shifted by a different amount. Additionally, the unshifted tonal filter kernel may be used to generate one of the offset-kernel images. Embodiments of steps 115 and 120 may generate multiple offset-kernel images in parallel or in series.

As discussed in detail below, each offset-kernel image is used to generate a sample of the local histogram or local histogram-based function for one or more pixels in the source image. Because of this, embodiments of the invention may use any arbitrary number of shifted tonal filter kernels to generate corresponding offset-kernel images, allowing the local histogram or local histogram-based function to be sampled at any desired resolution. Further embodiments of the invention may generate sufficient numbers of offset-kernel images to sample the local histogram or local histogram-based function at or above the Nyquist sampling rate limit.

Embodiments of the invention may set the width of the tonal filter kernel, the number shifted tonal filter kernels evaluated, and the location of the shifted tonal filter kernels to sample all or a fraction of the possible values of pixels at any desired resolution. Additionally, shifted tonal filter kernels may partially overlap. In a further embodiment, the shape of the tonal filter kernel may vary at the boundaries of the domain. For example, changing the shape of the tonal filter kernel prevents the area of the tonal filter kernel from decreasing as a result of being clipped at the boundary of the domain, which would bias the resulting local histogram or local histogram-based function against pixel values near domain boundaries, such as pixel values near 0 or 1 in the above example. In another example, if the pixel value domain is circular, (e.g. representing an angle or hue in an HSV color space), then the shifted tonal filter kernel may wrap at the domain boundaries.

Following the determination of one or more offset-kernel images by steps 115 and 120, method 100 determines the sampled local histogram or local histogram-based function for one or more source image pixels based on the set of offset-kernel images generated by steps 105 to 120. This set of offset-kernel images can be reused to determine the sampled local histogram or local histogram-based function for multiple source image pixels and/or for multiple neighborhoods of any arbitrary shape and size.

Step 125 selects a source image location for processing. The source image location may correspond with a single pixel in the source image or may be between two or more pixels. In the case of the latter, linear or non-linear interpolation may be used to determine one or more sub-pixel values in the source image and/or offset-kernel images for the selected source image location. Step 125 may select source image pixels based on instructions from a user or an application. In an embodiment, multiple iterations of step 125 are used to select and process all or a portion of the pixels of the source image.

Step 130 select a neighborhood filter size and neighborhood weights. Embodiments of step 130 can be used to generate sampled local histogram or local histogram-based function for any arbitrary size and shape neighborhood around the selected source pixel. The size and shape of the neighborhood filter can be used to control the aesthetics or other characteristics of the results. Embodiments of step 130 may select the neighborhood filter size and neighborhood weights based on instructions from a user or an application.

In an embodiment, a circular or radially symmetric neighborhood is selected by step 130 to avoid anisotropic visual artifacts. However, other embodiments of the invention may use asymmetrical neighborhoods for emphasis in a particular direction. Further embodiments of the neighborhood filter may alter frequency spectrum of pixel data. For example, the neighborhood filter may include a low-pass filter, a high-pass filter, a band-pass filter, or filters with other frequency domain characteristics.

Step 130 may define the filter neighborhood as a function with a set of weight values. Non-zero weight values in the filter neighborhood function specify neighboring pixels within the filter neighborhood. Conversely, zero weight values in the filter neighborhood function specify neighboring pixels outside the filter neighborhood. Additionally, an embodiment of the invention may have the influence of nearby pixels fall off gradually with distance. For this, an embodiment of step 130 sets the non-zero weight values in the function to be between one and zero, decreasing in value with distance from the center of the function. In a further embodiment, the function may be defined as an all positive weighting function with unit integral, such as a Gaussian function or distribution. Embodiments of method 100 may implement the filter neighborhood function discretely as a mask or analytically.

Step 135 determines the weighted sum of each offset-kernel image at the selected image location using the filter neighborhood. In an embodiment, step 135 selects one of the offset-kernel images. Step 135 then centers the filter neighborhood function at the image location of the offset-kernel image corresponding with the selected image location of the source image. Step 135 determines a weighted sum or a convolution of the neighborhood filter function with the selected offset-kernel image. The resulting value from this weighted sum represents a sample of the local histogram or histogram-based function.

Embodiments of step 135 may repeat this evaluation for all or a portion of the other offset-kernel images, resulting in a set of samples of the local histogram or histogram-based function. Step 140 combines the values determined from the local neighborhoods of the offset-kernel images to determine a local histogram or local histogram-based function output. In an embodiment, each offset-kernel image can be evaluated with respect to the filter neighborhood for the selected pixel to determine one sample of the local histogram or histogram-based function. Each sample represents the value of the local histogram or histogram-based function at the pixel input value associated with the shifted kernel used to generate its offset-kernel image.

Embodiments of step 140 may output the entire local histogram or histogram-based function. Further embodiments of step 140 interpolate between the samples of the local histogram or histogram-based function to determine values between samples. Embodiments of step 140 may use interpolation and other techniques on the local histogram or histogram-based function to find pixel input values corresponding with peaks, valleys, or zero-crossings of the local histogram or histogram-based function.

Steps 125 to 140 may be repeated to determine local histogram or histogram-based function values for additional pixels of the source image and/or for additional neighborhood shapes and sizes. In a further embodiment, all or a portion of steps 125 to 140 may be executed in parallel for two or more pixels to determine their respective local histograms or histogram-based functions.

Embodiments of method 100 may be used to determine sampled values of many types of local histogram and histogram-based functions. FIGS. 2A-2D illustrate additional example tonal filter kernels suitable for use with embodiments of the invention.

Figure 2A:
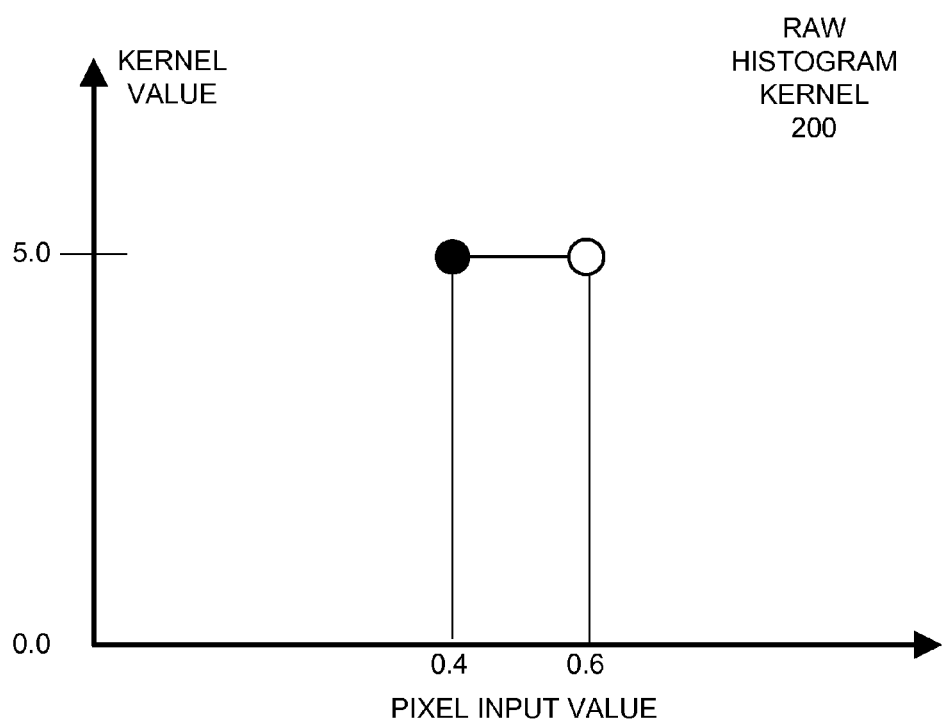
FIGS. 2A-2D illustrate additional example tonal filter kernels suitable for use with embodiments of the invention.

FIG. 2A illustrates a first example tonal filter kernel 200 suitable for use with embodiments of the invention. Tonal filter kernel 200 is a raw histogram intensity function. Tonal filter kernel 200 maps a pixel's scalar value, such as intensity or density, to a tonal filter kernel output value. In this example, tonal filter kernel 200 is centered around a pixel value of 0.5 and outputs a value of 5.0 for any pixel value from 0.4 up to, but not including, 0.6. The tonal filter kernel 200 outputs a value 0.0 for all other pixel values. In this example, the tonal filter kernel 200 integrates, or has an area of, 1.0. Using the example raw tonal filter kernel 200 with method 100 will result in sample values of a local raw or binned histogram function, with the histogram bins corresponding with tonal filter kernel 200 and the shifted versions of the tonal filter kernel 200.

Figure 2B:
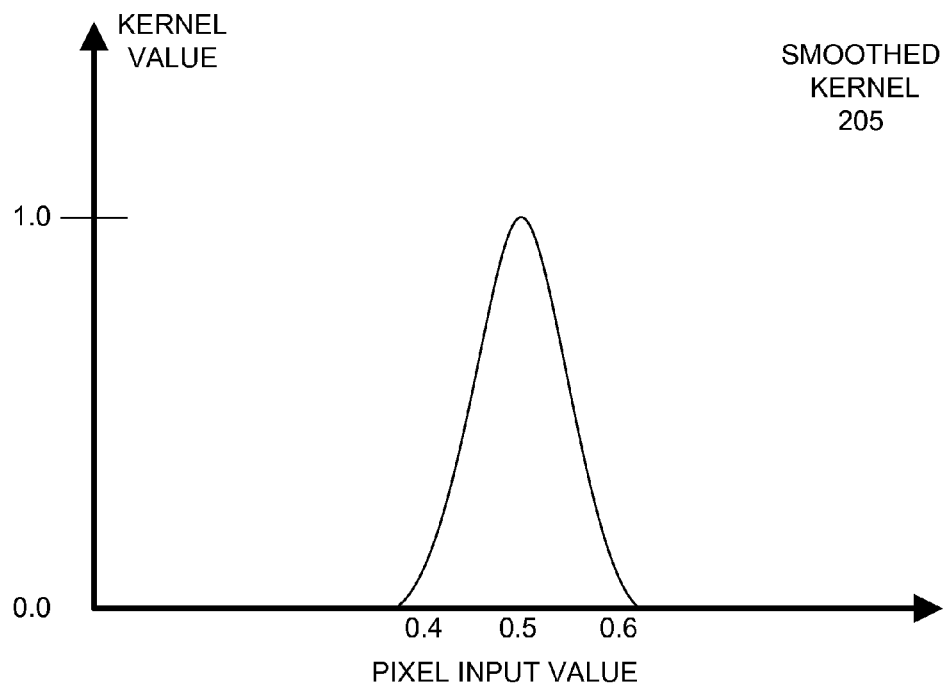

FIG. 2B illustrates an example smoothed kernel 205. In an embodiment, the smoothed kernel 205 may be a Gaussian distribution or function that integrates to one. Using method 100 with the tonal filter kernel 200 shown in FIG. 3A will result in sample values of a local smoothed histogram function.

Figure 2C:
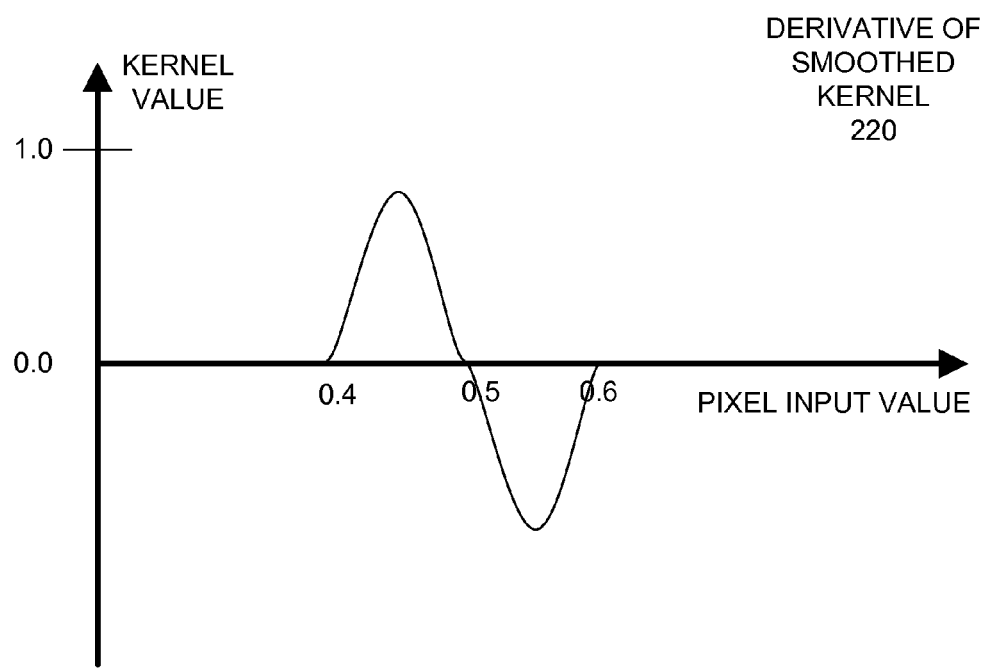

FIG. 2C illustrates an example derivative tonal filter kernel 220. The derivative tonal filter kernel 220 is determined from the derivative of a tonal filter kernel, such as smoothed tonal filter kernel 205. Using method 100 with the tonal filter kernel 205 will result in sample values of the derivative of the local smoothed histogram. In general, if using method 100 with an arbitrary tonal filter kernel K results in the sampled version of a local histogram-based function F, then using method 100 with the derivative K' of this tonal filter kernel will result in the sample version of the derivative of the local histogram-based function (i.e. F'). As discussed below, using a derivative of a tonal filter kernel, such as the derivative 220 of the smoothed tonal filter kernel 205, can be used to find the peaks or histogram modes of the local histogram function.

Figure 2D:
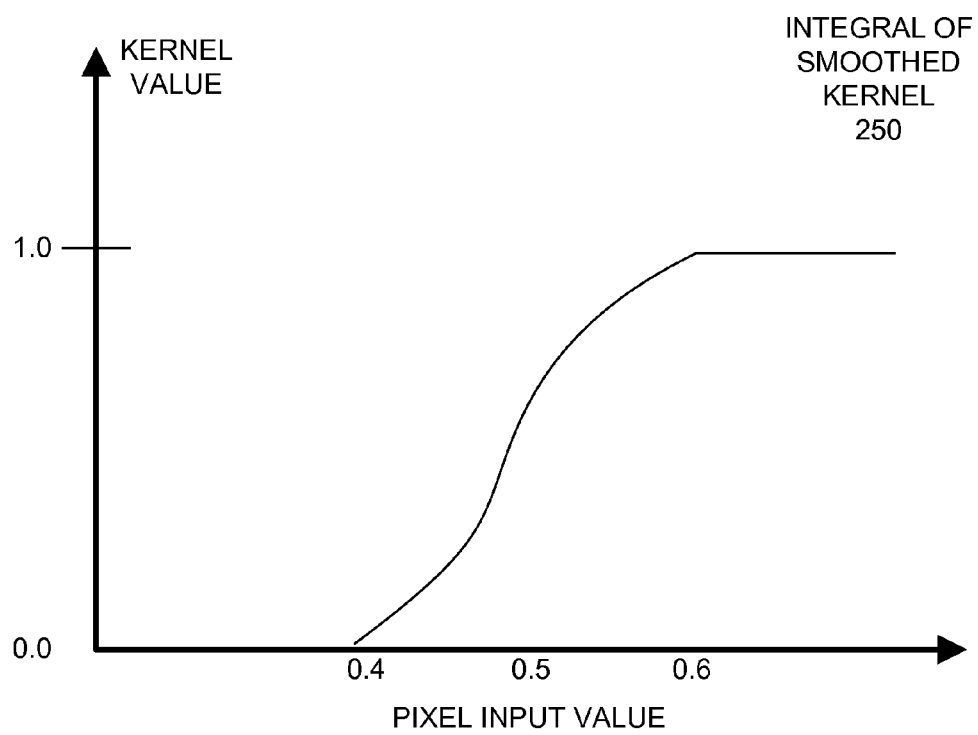

FIG. 2D illustrates an example integral tonal filter kernel 250. The integral tonal filter kernel 250 is determined by integrating smoothed tonal filter kernel 205. In general, if using method 100 with an arbitrary tonal filter kernel K results in the sampled version of a local histogram-based function F, then using method 100 with the integral of this tonal filter kernel will result in the sampled version of the integral of the local histogram-based function. Using method 100 with the tonal filter kernel 250 will result in sample values of the integral of the local smoothed histogram. As discussed below, using an integral of a tonal filter kernel, such as the integral 250 of the smoothed tonal filter kernel 205, can be used to find the properties such as the median value of the local histogram function for a specified image pixel and its neighborhood.

The local histogram function provides a great deal of information about the neighborhood surrounding pixels in an image. If the local histogram has a single peak or mode, then it is likely that the pixels in the neighborhood come from a similar origin. On the other hand, if the histogram has multiple modes, then the neighborhood probably contains pixels from two or more distinct populations. For stylization, noise reduction, segmentation and other purposes, it is desirable to identify and characterize the modes. In particular, an embodiment can identify the number of modes, their values, their widths and the percentage of the population contained within each mode.

One embodiment of the invention can identify local histogram modes using method 100 and a histogram filter kernel, such as tonal filter kernels 200 or 205, to determine the local histogram function. Once a sufficient number of samples of the local histogram function are determined, this embodiment of the invention can search the sampled local histogram function for peaks or local histogram modes.

Another embodiment of the invention can identify local histogram modes without directly determining the local histogram. In this embodiment, method 100 and the derivative of a histogram tonal filter kernel are used to determine the derivative of local histogram function. Once a sufficient number of samples of the derivative of the local histogram function are determined, this embodiment of the invention can search the sampled derivative of local histogram function for zero crossings of the derivative function. If there is a negative-going zero crossing between adjacent derivative function samples $D_i(p)$ and $D_{i+1}(p)$, then using interpolation, there is a mode located approximately at $$s = s_i + \frac{D_i(p)}{D_i(p) - D_{i+1}(p)}(s_{i+1} - s_i),$$

where $s_i$ and $s_{i+1}$ are the pixel input values, such as intensities, corresponding with the adjacent derivative function samples. A similar evaluation of positive-going zero crossings can be used to determine the location of valleys or negative extrema of a local histogram function, referred to as local histogram anti-modes.

Figure 3:
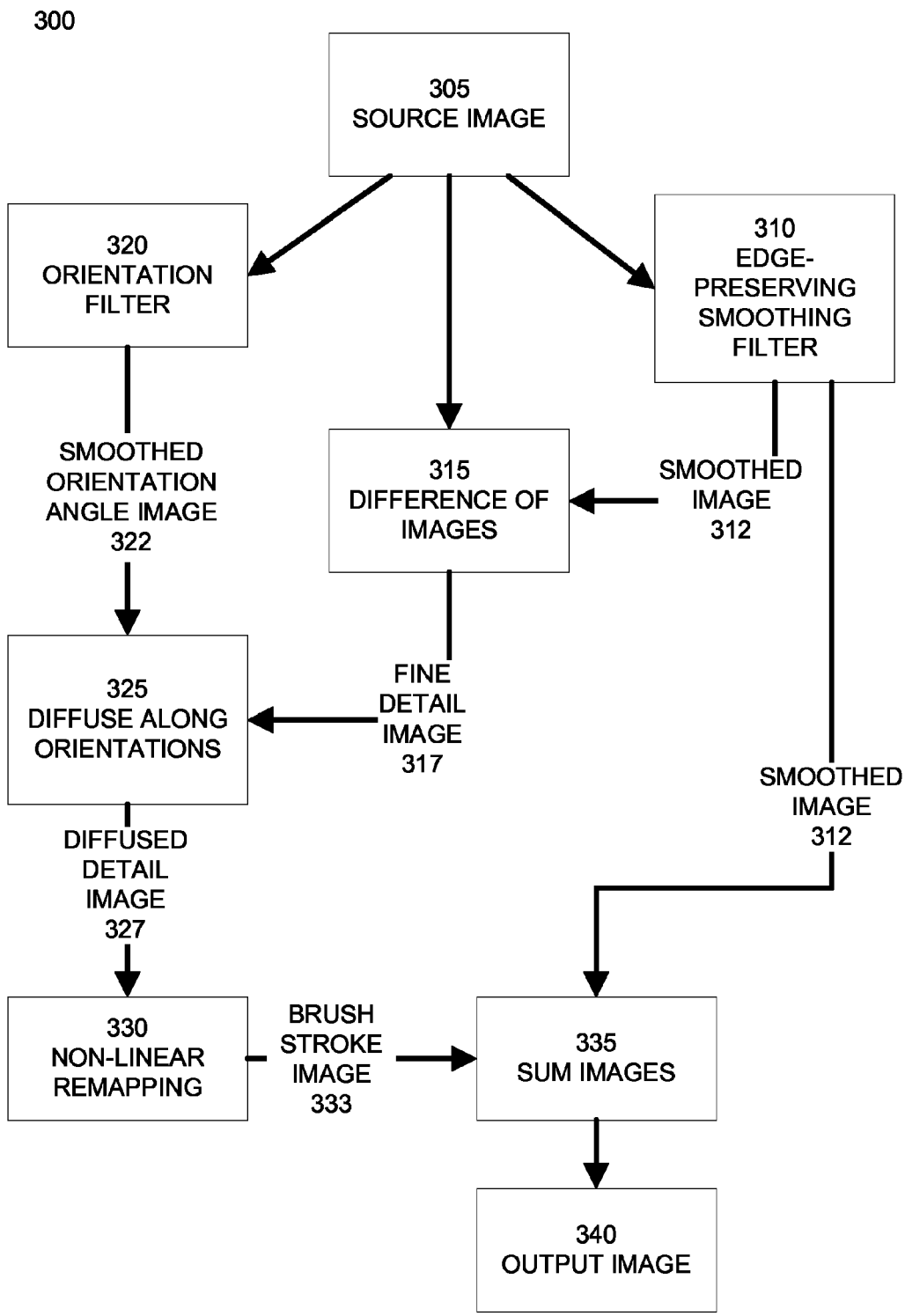
FIG. 3 illustrates a block diagram of a painterly filter suitable for applying non-photorealistic effects according to an embodiment of the invention.

FIG. 3 illustrates a block diagram of a painterly filter 300 suitable for apply non-photorealistic effects according to an embodiment of the invention. In an embodiment, filter 300 receives an input of one or more source images 305. As described above, the source image may be any type of one-dimensional, two-dimensional, three-dimensional, four-dimensional, or higher-dimensional data set, including still images, video, animation, voxel data sets, and volumetric data structures. Additionally, the received source image or images may include one dimension corresponding with time, such as a sequence of two-dimensional images arranged in time or a sequence of three dimensional voxel data arranged in time. Source image data may be generated by users using computer graphics content creation software, collected from the physical world using still or video cameras or other two-dimensional or three-dimensional imaging devices.

Filter 300 processes the source image with an edge-preserving smoothing filter 310. In an embodiment, the edge-preserving smoothing filter 310 may be a local histogram-based filter, such as a closest-mode filter, a median filter, or a dominant mode filter.

In an embodiment, a closest-mode filter identifies the local histogram peak, referred to as a histogram mode, closest to the value of a pixel. For example, if a pixel has a value of 0.4 and the local histogram function for this pixel and its neighborhood includes local histogram peaks or modes corresponding with pixel values of 0.5 and 0.1, the closest mode filter will output 0.5 as the closest mode for this pixel value.

In an embodiment, the closest-mode filter is evaluated by determining by first determining the local histogram for each image pixel for a specified pixel neighborhood. This embodiment of the closest-mode filter then searches each pixel's local histogram function for the histogram peak or mode closest to the value of the pixel.

In another embodiment, the closet-mode filter and other histogram based filters can identify a pixel's local histogram modes without directly determining the pixel's local histogram. In this embodiment, a derivative of the local histogram is determined using the technique described by method 100 using a tonal filter kernel such as example tonal filter kernel 220. The sampled derivative function is interpolated to determine the derivative value at the selected pixel's value. If this derivative is positive, then the closest-mode filter outputs the first mode greater than the selected pixel's value. Otherwise we output the first mode less than the selected pixel's value.

In a further embodiment, for image processing applications, the closest-mode filter is determined by transforming the original image into HSV space, then closest-mode filtered in the V channel and finally transformed back to RGB. The choice of HSV space for the filtering is to avoid slight misalignments that can arise in the positioning of edges in the different color channels. Additionally, the convolution may be determined hierarchically, so the amount of processing required is independent of the size of the local histogram neighborhood.

Where the input image crosses a mode boundary, the output of the closest-mode filter is discontinuous. When computed with a single sample per pixel, this can result in significant aliasing. To attenuate aliasing artifacts, an embodiment of the invention anti-aliases a source image with oversampling. In this embodiment, the derivative of the local histogram function is determined only once per pixel. However, this embodiment oversamples the original image with bilinear interpolation to determine multiple sub-pixel values. The closest-mode filter is applied to each sub-pixel value and the results are averaged together to yield anti-aliased closest mode value for the selected pixel.

Another embodiment of the edge preserving smoothing filter 310 includes a local median filter. In an embodiment, the method 100 used for determining the derivative function of a local histogram applies equally well to integrals or further derivatives of the smoothed local histogram ($\hat{f}_p$). For example, let E be the indefinite integral of a tonal filter kernel K. If K is a Gaussian, then E will be a corresponding erf function. We can estimate the integrals of $\hat{f}_p(s)$ as $R(p)=\int\!\!\hat{f}_p(s)ds=E(s-I_p)\otimes W$ using the functions $R_i(p)=E(I_p-s_i)\otimes W$, where W is the neighborhood weighting and E is the integral of the histogram tonal filter kernel, such as tonal filter kernel 250.

An embodiment of the invention determines the median filter using method 100 and the integral of a tonal filter kernel, such as tonal filter kernel 250, to determine a sampled integral function of the local histogram. This embodiment of the invention then uses interpolation to find an input value corresponding with a sampled integral function value of 0.5 (which is by definition the median).

Another embodiment of the edge preserving smoothing filter 310 includes a dominant mode filter. The dominant mode filter can be used as an alternative to the local median filter. For example, in some applications, the concept of a median is undefined. For example, angles exist on a circular domain that wraps or repeats every 360 degrees. Because there is no "beginning" or "end" to this domain, the median is undefined in this context.

In an embodiment, the dominant mode filter is determined using method 100 and a derivative of a tonal filter kernel, such as tonal filter kernel 220. Using the resulting sampled derivative function of the local histogram, an embodiment of the invention uses interpolation to find the input values corresponding with the local histogram modes (i.e. negative-going zero crossings) and local histogram anti-modes (i.e. positive-going zero crossings).

An embodiment of the dominant mode filter determines the area of the local histogram function under each identified local histogram mode. In an embodiment, the dominant mode filter uses method 100 and an integral of a tonal filter kernel, such as tonal filter kernel 250, to determine a sampled integral function of the local histogram. For each identified local histogram mode, an embodiment subtracts the value of the sampled integral function of the local histogram at its right-most adjacent anti-mode from the value of the sampled integral function of the local histogram at its left-most adjacent anti-mode. This gives the value of integral function underneath of the local histogram mode. The local histogram mode with the largest integral value is the dominant mode. The magnitude and/or the input value corresponding with the dominant mode is then output by the dominant mode filter.

Embodiments of the dominant mode filter can be applied to circular and non-circular domains. However, for circular domains, an embodiment of the dominant mode filter computes the integrals taking into account branch cuts, such as the transition of an angular domain from 359 degrees to 0 degrees. For integrals that span the branch cut, an embodiment of the dominant mode filter determines the integral in two pieces, one on each side of the branch cut.

Like the local median filter, the dominant mode filter removes the noise very effectively. A close examination will also reveal that it produces a sharper output on some edges than the median. This is a common feature of mode filters. At mode boundaries, the dominant mode filter will switch discontinuously from one mode to another, creating an absolutely sharp edge where a somewhat blurred edge may have existed previously. For a smoother result, embodiments of the local median filter, closest-mode filter, dominant mode filter, and any other mode-based filter can be blended together when two modes account for nearly equal fractions of the population (i.e. when two modes have nearly equal magnitudes).

In a further embodiment, other filter types, such as a mean-shift filter or a bilateral filter may also be used as the edge-preserving smoothing filter 110.

Following the application of a edge-preserving smoothing filter 310 to the source image 305, an embodiment of the painterly filter 300 determines a fine detail image 317 image by subtracting 315 the smoothed image 312 output by the edge-preserving smoothing filter 310 from the source image 305.

Additionally, the source image 305 is provided to an orientation filter 320. The orientation filter 320 determines the local angular orientations of the gradient of the source image 305. In an embodiment, the orientation filter 320 first determines a gradient angle value for each pixel of the source image. However, gradient angles that are anti-parallel, i.e. differ by 180 degrees or pi radians, are equivalent. To prevent these anti-parallel gradient angles from cancelling each other out, an embodiment of the orientation filter 320 doubles the gradient angle values of each pixel of the source image and then remaps them to the same circular domain, such as 0 to 359 degrees. This will cause formerly anti-parallel gradient angles to reinforce each other.

An embodiment of the orientation filter 320 then applies an edge preserving smoothing filter to the doubled gradient-angle image, so the orientation information is not blurred across object boundaries. Embodiments of the edge preserving smoothing filter used by the orientation filter 320 include a bilateral filter, Gaussian low-pass filters, and local histogram-based filters such as the local closest-mode filter or the local dominant mode filter. In a further embodiment, the gradient magnitude associated with each local gradient angel value is used as an additional weight by the edge-preserving smoothing filter, so that strong gradients are weighted more heavily than weak ones. Following the application of the edge-preserving smoothing filter to the doubled gradient-angle image, an embodiment of the orientation filter 320 halves the smoothed gradient angle values to return the gradient angles to their correct orientation. The orientation filter 320 then outputs a smoothed orientation angle image 322.

An embodiment of the painterly filter 300 then provides the smoothed orientation angle image 322 and the fine detail image 317 to a diffusion filter 325 to create the appearance of brushstrokes or other artistic media. In an embodiment, the diffusion filter 325 diffuses the pixels of the fine detail image 317 in the directions specified by their corresponding pixels of the smoothed orientation angle image 322. This has the effect of blurring or spreading each pixel value in the direction of the orientation angle determined at that pixel location. In an embodiment, the diffusion filter 325 uses a one-dimensional diffusion along integral curves of the orientation field. In this embodiment, the diffusion performs multiple diffusion passes over the fine detail image 317. If $H_0$ is the original fine detail image 317, the directional diffusion is calculated using the iteration $$H_{i+1}(p) = \frac{1}{4}(H_i(p+v) + 2H_i(p) + H_i(p-v)),$$

where v for each pixel is a unit vector in the direction of the corresponding pixel of the smoothed orientation angel image 322. Embodiments of the diffusion filter 325 may be use any number of iterations, depending upon the desired aesthetic effect. Example iteration numbers range between 10 and 100 iterations. Alternative embodiments of the diffusion filter 325 may use a two or more dimensional diffusion functions, or other diffusion techniques. The output of the diffusion filter 325 is a diffused detail image 327.

An embodiment of the painterly filter 300 applies a non-linear remapping 330 to the diffused detail image 327 to produce sharper edges more characteristic of brush strokes. In an embodiment, the non-linear remapping 330 non-linearly remaps the values of the diffused detail image 327 to increase the contrast of the image. The remapped image is output as a brush stroke image 333. In another embodiment, non-linear remapping 330 may be implemented as a scaling and clamping operation.

An embodiment of the painterly filter 300 then determines a weighted sum 335 of the brush stroke image 333 with the smoothed image 312. An alternative embodiment determines a weighted sum 335 of the brush stroke image 333 with the source image 305. The relative weights used to combine these two images may be set based on the desired aesthetic effect, with higher weights for the brush stroke image 333 resulting in more prominent brush strokes in the final output image. The result of this weighted sum 335 is an output image.

Method 300 may be repeated for any number of input source images, such as a sequence of animation or video. Further embodiments of method 300 may be applied to sequences of images or other data arranged in time. In these embodiments, one or more of the local histogram-based filters, such as the edge-preserving smoothing filter 310 or the orientation filter 320 are extended to the concept of a local histogram neighborhood covering pixels near a selected pixel in space, but also pixels near the selected pixel in time.

In an embodiment, extending histogram neighborhoods to include time uses a weighting function extending in both space and time, such as a causal temporal weighting function $$W = \frac{1}{\sigma\lambda\sqrt{2\pi}} e^{-x^2/2\sigma^2 - \lambda x}.$$

Another type of causal temporal weighting function is a running average weighting, in which the local histogram function at a given time is weighted and combined with the running average of two or more local histogram functions at previous times. In an embodiment, the temporal weighting function is combined with a spatial weighting function, such as the Gaussian neighborhood weighting function described above.

Convolutions with the weighting function can be done separably in space and time. In an embodiment, spatial portion of the weighting function is implemented as above and a first-order recursive filter, such as the running average filter, is implemented as the temporal component.

One problem with combining a smoothed image 312 with a detailed image, such as brush stroke image 333 is preventing high-contrast large-scale edges from "leaking" into the detail layers, which can cause halos or other artifacts in further processing.

From a statistical point of view, the base layer should contain variations of the mode over the image and the transitions from mode to mode. The detail image should be limited to variation within a single mode. Embodiments of the invention can be applied to make this distinction.

For example, if a pixel has a value between two local histogram modes of nearly equal magnitude, it is very likely that the pixel is a transitional value on the edge between the two modes. In an embodiment, a function C is defined as the ratio of the populations of the most frequent mode to the second most frequent mode. If there is only one mode, C will be infinite. An embodiment of the invention defines a Halo removal function as C−1, which may be scaled and clipped. A detail image may be multiplied by the halo removal function to avoid halo artifacts.

Figure 4:
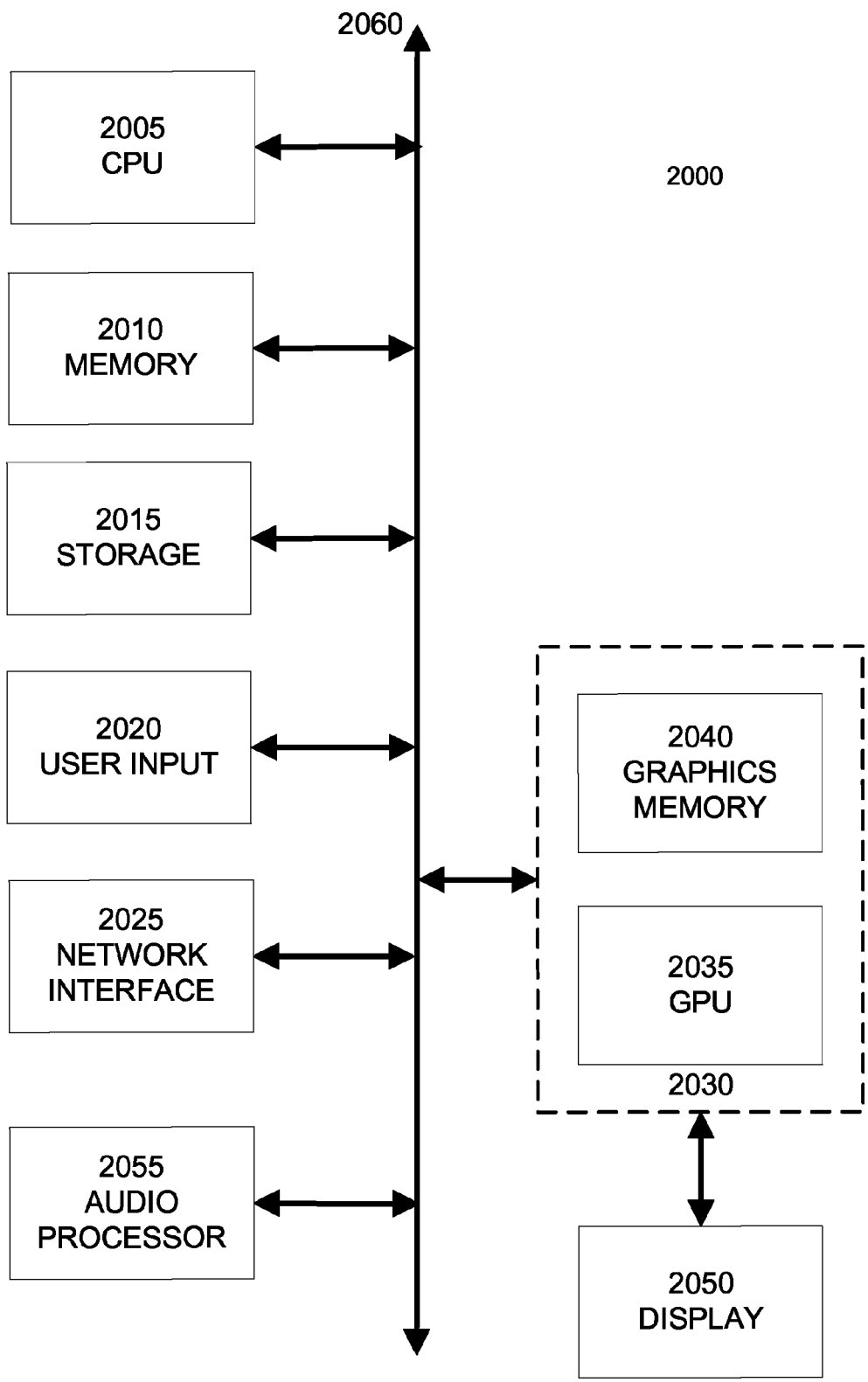
FIG. 4 illustrates a computer system suitable for implementing an embodiment of the invention.

FIG. 4 illustrates a computer system 2000 suitable for implementing an embodiment of the invention. FIG. 4 is a block diagram of a computer system 2000, such as a personal computer, video game console, personal digital assistant, or other digital device, suitable for practicing an embodiment of the invention. Computer system 2000 includes a central processing unit (CPU) 2005 for running software applications and optionally an operating system. CPU 2005 may be comprised of one or more processing cores. Memory 2010 stores applications and data for use by the CPU 2005. Storage 2015 provides non-volatile storage for applications and data and may include fixed or removable hard disk drives, flash memory devices, and CD-ROM, DVD-ROM, Blu-ray, HD-DVD, or other magnetic, optical, or solid state storage devices.

User input devices 2020 communicate user inputs from one or more users to the computer system 2000, examples of which may include keyboards, mice, joysticks, digitizer tablets, touch pads, single or multitouch touch screens, still or video cameras, and/or microphones. Network interface 2025 allows computer system 2000 to communicate with other computer systems via an electronic communications network, and may include wired or wireless communication over local area networks and wide area networks such as the Internet. An audio processor 2055 is adapted to generate analog or digital audio output from instructions and/or data provided by the CPU 2005, memory 2010, and/or storage 2015. The components of computer system 2000, including CPU 2005, memory 2010, data storage 2015, user input devices 2020, network interface 2025, and audio processor 2055 are connected via one or more data buses 2060.

A graphics subsystem 2030 is further connected with data bus 2060 and the components of the computer system 2000. The graphics subsystem 2030 includes at least one graphics processing unit (GPU) 2035 and graphics memory 2040. Graphics memory 2040 includes a display memory (e.g., a frame buffer) used for storing pixel data for each pixel of an output image. Graphics memory 2040 can be integrated in the same device as GPU 2035, connected as a separate device with GPU 2035, and/or implemented within memory 2010.

Pixel data can be provided to graphics memory 2040 directly from the CPU 2005. In some implementations, instructions and/or data representing a scene are provided to renderfarm or set of server computers, each similar to computer system 2000, via the network interface 2025 or storage 2015. The renderfarm generates one or more rendered images of the scene using the provided instructions and/or data. These rendered images are returned to the computer system 2000 for display.

Alternatively, CPU 2005 provides the GPU 2035 with data and/or instructions defining the desired output images, from which the GPU 2035 generates the pixel data of one or more output images. The data and/or instructions defining the desired output images can be stored in memory 2010 and/or graphics memory 2040. In an embodiment, the GPU 2035 includes 3D rendering capabilities for generating pixel data for output images from instructions and data defining the geometry, lighting, shading, texturing, motion, and/or camera parameters for a scene. The GPU 2035 can employ any surface or volume rendering technique known in the art to create one or more rendered images from the provided data and instructions, including rasterization, scanline rendering, REYES or micropolygon rendering, ray casting, ray tracing, image-based rendering techniques, and/or combinations of these and any other rendering or image processing techniques known in the art. The GPU 2035 can further include one or more programmable execution units capable of executing shader programs. GPU 2035 can be comprised of one or more graphics processing unit cores.

The graphics subsystem 2030 periodically outputs pixel data for an image from graphics memory 2040 to be displayed on display device 2050. Display device 2050 is any device capable of displaying visual information in response to a signal from the computer system 2000, including CRT, LCD, plasma, OLED, and SED displays. Computer system 2000 can provide the display device 2050 with an analog or digital signal.

In embodiments of the invention, CPU 2005 is one or more general-purpose microprocessors having one or more homogenous or heterogeneous processing cores. In further embodiments, all or a portion of the graphics subsystem 2030 or GPU 2035 is integrated into CPU 2005.

In an further embodiment, the graphics subsystem 2030 and GPU 2035 may be adapted to perform non-graphics computations, operating as a programmable vector or stream data processing. Parallel programming architectures such as CUDA allow programmers to utilize the GPU 2035 to execute general-purpose algorithms via computational interfaces such as OpenCL and DX11 Compute.

Further embodiments can be envisioned to one of ordinary skill in the art after reading the attached documents. In other embodiments, combinations or sub-combinations of the above disclosed invention can be advantageously made. The block diagrams of the architecture and flow charts are grouped for ease of understanding. However it should be understood that combinations of blocks, additions of new blocks, re-arrangement of blocks, and the like are contemplated in alternative embodiments of the present invention.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A non-transitory computer-readable medium storing computer-executable code for generating visual effects, the non-transitory computer-readable medium comprising:
   code for receiving a first image and second image;
   code for receiving a smoothed image generated in response to applying an edge-preserving smoothing filter to the first image;
   code for receiving an orientation angle image generated in response to applying an orientation filter to the second image;
   code for receiving a fine detail image generated based on the smoothed image and the first image;
   code for receiving a brush stroke image generated in response to diffusing the fine detail image according to the orientation angle image; and
   code for generating a third image in response to combining the brush stroke image with the smoothed image.

2. The non-transitory computer-readable medium of claim 1, wherein the edge preserving smoothing filter and the orientation filter includes at least one local histogram-based filter.

3. The non-transitory computer-readable medium of claim 2, wherein the local histogram-based filter includes a closest mode filter.

4. The non-transitory computer-readable medium of claim 2, wherein the local histogram-based filter includes a median filter.

5. The non-transitory computer-readable medium of claim 2, wherein the local histogram-based filter includes a dominant mode filter.

6. The non-transitory computer-readable medium of claim 2, wherein the local histogram-based filter is based on a sampled local histogram.

7. The non-transitory computer-readable medium of claim 2, wherein the local histogram-based filter is based on a sampled derivative of a local histogram.

8. The non-transitory computer-readable medium of claim 2, wherein the local histogram-based filter is based on a sampled integral of a local histogram.

9. The non-transitory computer-readable medium of claim 1, wherein the first and second images are the same source image.

10. The non-transitory computer-readable medium of claim 1, wherein the orientation filter includes a local histogram-based filter applied to an image based on gradient angles of the second image.

11. The non-transitory computer-readable medium of claim 10, wherein the image is based on doubled gradient angles of the second image.

12. The non-transitory computer-readable medium of claim 2, wherein the local histogram-based filter includes a local neighborhood having at least one spatial dimension.

13. The non-transitory computer-readable medium of claim 2, wherein the local histogram-based filter includes a local neighborhood having at least one temporal dimension.

14. The non-transitory computer-readable medium of claim 2, wherein the local neighborhood is causal in its temporal dimension.

15. The non-transitory computer-readable medium of claim 2, wherein the local histogram-based filter is based on a convolution of a local neighborhood function with a plurality of offset-kernel images.

16. The non-transitory computer-readable medium of claim 1, wherein the edge-preserving smoothing filter includes a bilateral filter.

17. The non-transitory computer-readable medium of claim 1, further comprising:
wherein the code for receiving the first and second image comprises code for receiving a source image;
wherein the code for receiving the orientation angle image comprises code for applying the orientation filter to the source image to create the orientation angle image;
wherein the code for receiving the brush stroke image comprises code for diffusing a detail image derived from the source image based on the orientation angle image to create a diffused detail image; and
wherein the code for generating the third image comprises code for combining the diffused detail image with a base image derived from the source image to create an orientation-enhanced image.

18. The non-transitory computer-readable medium of claim 17, wherein the code for applying the orientation filter comprises:
code for determining a gradient image from the source image;
code for determining first orientation angles from the gradient image;
code for doubling the first orientation angles;
code for remapping the doubled orientation angles to a circular domain; and
code for halving the remapped orientation angles.

19. The non-transitory computer-readable medium of claim 18, further comprising:
code for applying the edge-preserving smoothing filter following the remapping of the doubled orientation angles.

20. A method for generating visual effects, the method comprising:
receiving, at one or more computer systems, a first image and second image;
receiving, at the one or more computer systems, a smoothed image generated in response to applying an edge-preserving smoothing filter to the first image;
receiving, at the one or more computer systems, an orientation angle image generated in response to applying an orientation filter to the second image;
receiving, at the one or more computer systems, a fine detail image generated based on the smoothed image and the first image;
receiving, at the one or more computer systems, a brush stroke image generated in response to diffusing the fine detail image according to the orientation angle image; and
generating, with one or more processors associated with the one or more computer systems, a third image in response to combining the brush stroke image with the smoothed image.

21. The method of claim 20, further comprising:
wherein receiving the first and second image comprises receiving a source image;
wherein receiving an orientation angle image comprises applying the orientation filter to the source image to create the orientation angle image;
wherein receiving the brush stroke image comprises diffusing a detail image derived from the source image based on the orientation angle image to create a diffused detail image; and
wherein generating the third image comprises combining the diffused detail image with a base image derived from the source image to create an orientation-enhanced image.

22. The method of claim 21, wherein applying the orientation filter comprises:
determining a gradient image from the source image;
determining first orientation angles from the gradient image;
doubling the first orientation angles;
remapping the doubled orientation angles to a circular domain; and
halving the remapped orientation angles.

23. The method of claim 22, further comprising:
applying the edge-preserving smoothing filter following the remapping of the doubled orientation angles.

24. The method of claim 20, wherein the edge preserving smoothing filter and the orientation filter includes at least one local histogram-based filter comprising a closest mode filter, a median filter, a dominant mode filter, a filter based on a sampled local histogram, a filter based on a sampled derivative of a local histogram, or a filter based on a sampled integral of a local histogram.

25. The method of claim 20, wherein the first and second images are the same source image.

26. The method of claim 20, wherein the orientation filter includes a local histogram-based filter applied to an image based on gradient angles of the second image.

27. The non-transitory computer-readable medium of claim 20, wherein the local histogram-based filter includes a local neighborhood having at least one spatial dimension, a local neighborhood having at least one temporal dimension, or based on a convolution of a local neighborhood function with a plurality of offset-kernel images.

28. The method of claim 27, wherein the image is based on doubled gradient angles of the source second image.

29. The method of claim 20, wherein the edge-preserving smoothing filter includes a bilateral filter.

* * * * *